United States Patent [19]
Serrano

[11] Patent Number: 5,999,357
[45] Date of Patent: *Dec. 7, 1999

[54] METHOD AND APPARATUS FOR SPINDLE SYNCHRONIZATION TO REDUCE DRIVE TO DRIVE RUNOUT

[75] Inventor: Louis Joseph Serrano, San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/654,736

[22] Filed: May 30, 1996

[51] Int. Cl.⁶ ................................................ G11B 27/30
[52] U.S. Cl. .................................... 360/73.02; 360/77.04
[58] Field of Search .......................... 360/73.01, 73.02, 360/73.03, 77.02, 77.04, 71, 75

[56] References Cited

U.S. PATENT DOCUMENTS

| | | | |
|---|---|---|---|
| 4,536,809 | 8/1985 | Sidman | 360/75 |
| 4,870,643 | 9/1989 | Bultman et al. | 360/73.02 X |
| 4,907,105 | 3/1990 | Kurzweil, Jr. | 360/73.02 |
| 4,918,544 | 4/1990 | Ishizuka et al. | 360/73.03 |
| 5,099,367 | 3/1992 | Sidman | 360/77.05 |
| 5,115,359 | 5/1992 | Sidman | 360/77.05 |
| 5,159,503 | 10/1992 | Mitamura et al. | 360/77.02 |
| 5,249,254 | 9/1993 | Murphy et al. | 360/73.02 X |
| 5,404,492 | 4/1995 | Moraru et al. | 360/78.04 X |
| 5,488,274 | 1/1996 | Satoh | 360/73.03 X |
| 5,539,714 | 7/1996 | Andrews, Jr. et al. | 360/77.04 X |
| 5,585,976 | 12/1996 | Pham | 360/77.04 |
| 5,615,191 | 3/1997 | Takeda et al. | 360/77.04 X |
| 5,615,368 | 3/1997 | Terashima et al. | 360/77.04 X |

*Primary Examiner*—Aristotelis M. Psitos
*Assistant Examiner*—James L Habermehl
*Attorney, Agent, or Firm*—Merchant and Gould, P.A.

[57] ABSTRACT

A method and apparatus for improving data integrity and density in an array of disk drives by synchronizing spindles prior to correcting for repeatable runout (RRO). The invention includes a drive control circuit for controlling synchronization, initiating runout cancellation calibration, and granting customer use of the disk drives. In a further aspect of the invention, rotation of the spindles is monitored for changes. The drive control circuit initiates resynchronization and recalibration of the runout cancellation for the disk drives in response to receiving an indication from the rotation detector that rotation of at least one of the spindles in the disk drives has changed. Initially, or after a change is detected, one of the disk drives is selected as a master and a synchronization signal is routed to each of the disk drives from the selected master drive for synchronizing the spindles in the disk drives. The rotation detector detects the addition and removal of a disk drive to the rack, and the addition and removal of a disk drive to or from the rack is equated with a change in the rotation of a spindle in the disk drives thereby triggering resynchronization of the spindles and recalibration of the runout.

31 Claims, 7 Drawing Sheets

METHOD AND APPARATUS FOR SPINDLE SYNCHRONIZATION TO REDUCE DRIVE TO DRIVE RUNOUT

BACKGROUND OF THE INVENTION

1. Field of the Invention

This invention relates in general to a method and apparatus for improving data integrity and density in rack-mounted disk drives, and more particularly, to a method and apparatus for spindle synchronization to reduce drive-to-drive runout.

2. Description of Related Art

In a customer environment, disk drives are frequently mounted together in racks. Associated with these disk drives, a disk controller decodes servo data from either or both the dedicated and data surfaces so that the servo control may be modified, if necessary, to continuously maintain the position of the data head in alignment with a selected data track centerline. Nevertheless, several factors limit the alignment accuracy, and thus the maximum attainable data track density, of a disk storage device.

A most notable. mechanical disturbance is spindle "runout", or "wobble", which is the difference between the actual centerline of a track and the effective centerline presented to a head positioned a fixed distance from the mounting center of the disk. Runout may be caused by slight eccentricity in the mounting of the disk on its drive spindle or from vibrations transmitted through the racks from other disk drives. Runout caused by mounting eccentricity is substantially static and thus may be accounted for by calibration techniques that cancel the effect from this type of runout. Nevertheless, racks are designed by the customer without regard to the interaction between drives. As a result, runout induced by a neighboring drive's spindle motor presents a more difficult problem.

In a rack, some of the runout is due to the spindle motor of an adjacent drive and is not locked in time to the control. Currently, however, high end disk drives offer spindle synchronization. The spindle may be controlled so that each revolution starts at a fixed phase from a master pulse. The important consequence of this is that all the spindle motors are locked in time.

In a conventional spindle motor control system for a magnetic disk apparatus, an output signal from a crystal oscillator may be counted, and the count decoded by a decoder for detecting upper and lower limits of the rotation speed of each spindle motor to thereby control the rotation speed of each spindle motor. In addition, phase control may be performed by accelerating or decelerating the spindle motor in accordance with a phase relationship between a pulse generated at the center of a sector counter and a synchronizing signal input from an external controller so that the index pulse coincides with the synchronizing signal from the external controller.

In the above-described spindle motor control system for a magnetic disk apparatus, speed control is performed for each spindle motor within the range of upper and lower limits of the rotation speed of the spindle motor, and then synchronization between the respective spindle motors is controlled. Therefore, the rotation speeds of the plurality of spindle motors differ from each other and variations in rotation speed also differ from each other because loads acting on the motors are different. Therefore, it is difficult to maintain the rotation speeds and the phases of the plurality of spindle motors coincident with each other for a long period of time.

Attempts have been made to improve on the synchronization of the rotation of the spindles for a disk drive system. For example, U.S. Pat. No. 4,918,544, issued Apr. 17, 1990, to Ishizuka et al., entitled "MULTI-SPINDLE SYNCHRONIZATION CONTROL SYSTEM FOR MAGNETIC DISK APPARATUS", incorporated herein by reference, discloses a multi-spindle synchronization control system for a magnetic disk apparatus. The multi-spindle synchronization control system includes a plurality of magnetic disk units each for receiving a reference clock pulse to control rotation of a spindle motor. An index pulse is generated by detecting rotation of the spindle motor and a crystal oscillator generates a master clock having a predetermined frequency. A counter converts the master clock into a master index pulse that is generated upon each rotation of the spindle motor. A plurality of spindle synchronization control circuits are each connected to a corresponding one of the plurality of magnetic disk units for maintaining the rotation speeds and the phases of the plurality of spindle motors coincident with each other. Nevertheless, even though the rotation of the spindle motors may be synchronized, runout due to vibrations may still occur.

As mentioned above, techniques for compensating for runout in individual drives due to eccentric mounting have been developed. For example, during operation the runout from a drive's own spindle motor may be measured, and a repeatable runout (RRO) cancellation control may be used to cancel its effect. The runout will not change over time since both the motor drive and counteracting control are locked in time.

However, as mentioned above, some of the runout for a drive in a rack is due to the spindle motor of an adjacent drive. This runout is not locked in time to the control of the runout due to the drive's own spindle motor RRO cancellation. In fact, the runout will inevitably drift 180 degrees out of phase from the initial control. When this happens, the counteracting control may now be enhancing this component of runout instead of reducing it. This situation can in the extreme lead to hard errors due to excessive runout. As the track pitch decreases and the spindle speed increases, this effect will become even more deleterious.

One method to minimize drive-to-drive interaction is to improve the rack design, but this must be done by the customer. Accordingly, the customer will view this as an additional expense, and if the redesign is not required by all types of drives, drives requiring the redesign will be viewed as more expensive and therefore be less competitive.

A method that does not involve the customer is to constantly update the RRO cancellation control by monitoring the runout. But the drive-to-drive component can shift 180 degrees in less than a minute, so to keep pace with phase shift only the latest few revolutions can be used to calculate the control. With so little data, a good estimate of the runout is uncertain.

Further, only the fundamental of the spindle frequency is cancelled. The higher harmonics will still move in and out of phase with this method thereby increasing track squeeze and the possibility of reading old information while on track. Though not cancelled, with spindle sync the effect of the higher harmonics will stay constant from operation to operation, even after the rack is powered off and on again.

It can be seen then that there is a need for a method and apparatus for spindle synchronization and runout cancellation to reduce drive-to-drive runout.

SUMMARY OF THE INVENTION

To overcome the limitations in the prior art described above, and to overcome other limitations that will become apparent upon reading and understanding the present specification, the present invention discloses a method and apparatus for improving data integrity and density in rack-mounted disk drives.

The present invention solves the above-described problems by providing a method and apparatus for spindle synchronization to reduce drive-to-drive runout whereby the disk drives of an array are spindle-synchronized prior to initiation of repeatable runout (RRO) calibration or recalibration at powerup whenever a change in spindle speed is detected.

A system in accordance with the principles of the present invention includes a drive control circuit for controlling synchronization, initiating runout cancellation, and granting customer use of the disk drives. A signal generator is coupled to the control circuit for generating a master signal and a runout calibration command. The master signal commands the disk drives to synchronize rotation of the spindles and the runout calibration cancellation command instructs the disk drives to recalibrate a runout cancellation. A rotation detector is also coupled to the control circuit for detecting a change in the rotation of the spindles and providing to the control circuit an indication of whether the rotation of a spindle of a disk drive has changed. The drive control circuit initiates resynchronization and recalibration of the runout cancellation for the plurality of disk drives in response to receiving an indication from the rotation detector that rotation of at least one of the spindles in the plurality of disk drives has changed.

One aspect of the present invention is that one of the disk drives is selected as a master, and a synchronization signal is routed to each of the disk drives from the selected master drive for synchronizing the spindles in all of the disk drives.

Another aspect of the present invention is that the controller may be coupled to the plurality of disk drives via a data bus.

Another aspect of the present invention is that the synchronization of the spindles phase-locks the rotation of the spindles of each of the plurality of disk drives so that the runout cancellation for the plurality of disk drives is stabilized.

Yet another aspect of the present invention is that the rotation detector detects the addition and removal of a disk drive to and from the rack which may cause loss of synchronization.

Another aspect of the present invention is that the addition and removal of a disk drive to and from the rack is equated with a change in the rotation of a spindle in the disk drives thereby triggering resynchronization of the spindles and recalibration of the runout.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for spindle synchronization to reduce drive-to-drive runout, by spindle-synching an array of disk drives prior to compensating for RRO.

Figure 1:
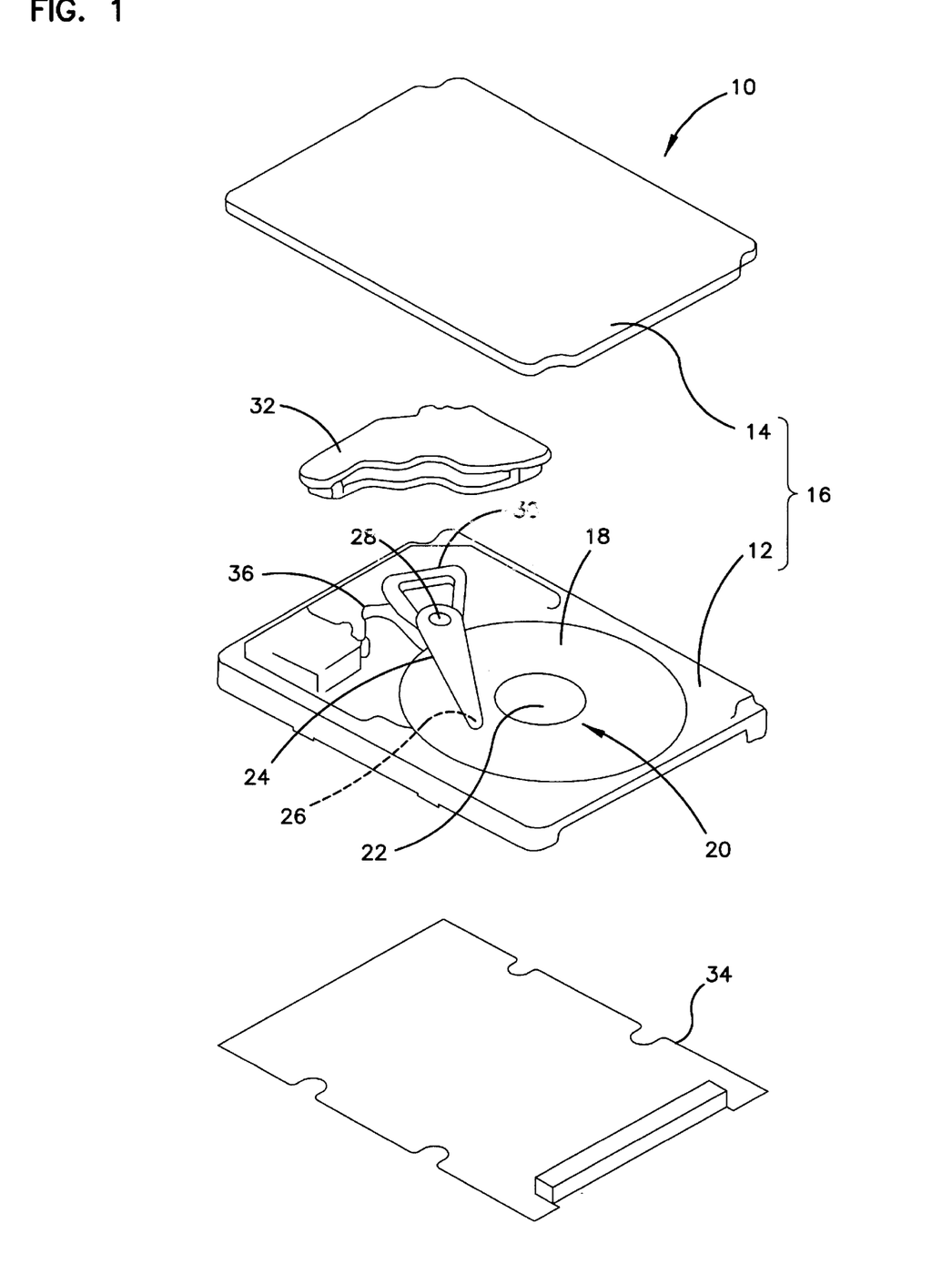
FIG. 1 is a disk drive according to the present invention.

As shown in FIG. 1, a disk drive 10 such as a magnetic, optical, or magneto-optical disk apparatus has an enclosure case 16 comprising a shallow base 12 and a cover 14 that covers the open top of said shallow base 12. The enclosure case 16 has a thin rectangular box-like shape and is placed horizontally in a computer or a disk drive rack. A magnetic disk 18 is contained inside the enclosure case 16 as part of a rotor assembly. The magnetic disk 18 is installed on the hub 22 of the spindle motor 20, and said magnetic disk 18 is rotationally driven by said spindle motor 20. The hub 22 is designed to be able to have selectively installed at least one magnetic disk 18 on a common axis thereof.

A head arm 24 that has a magnetic head 26 on one end is placed inside of the enclosure case 16. The center portion of the head arm 24 may be supported on the base 12 through a pivot 28 so as to rotate freely. At the other end of the head arm 24, a voice coil motor (VCM) assembly comprising a coil 30 and permanent magnets 32 is provided to enable the headarm 24 to rotate so that the magnetic head 26 can read, write, and delete magnetic information because it is position-controlled in the radial direction of the magnetic disk 18.

In addition, a controller card 34, which is actually a circuit board, may be attached to the outside (bottom) of the base. The power and signals such as read signals for the magnetic head 26 and the power for the VCM are transferred between the card 34 and the above-described head arm 24. The power and signals for the spindle motor 20 are transferred between the card 34 and the above-described spindle motor 20. The head arm 24 is connected to the card 34 at the bottom of the base 12 through the flexible cable 36, and the spindle motor 20 is connected to the card 34 also at the bottom of base 12. The controller card 34 may also include a controller circuit to perform feedback control for the speed of the spindle motor 20.

Figure 2:
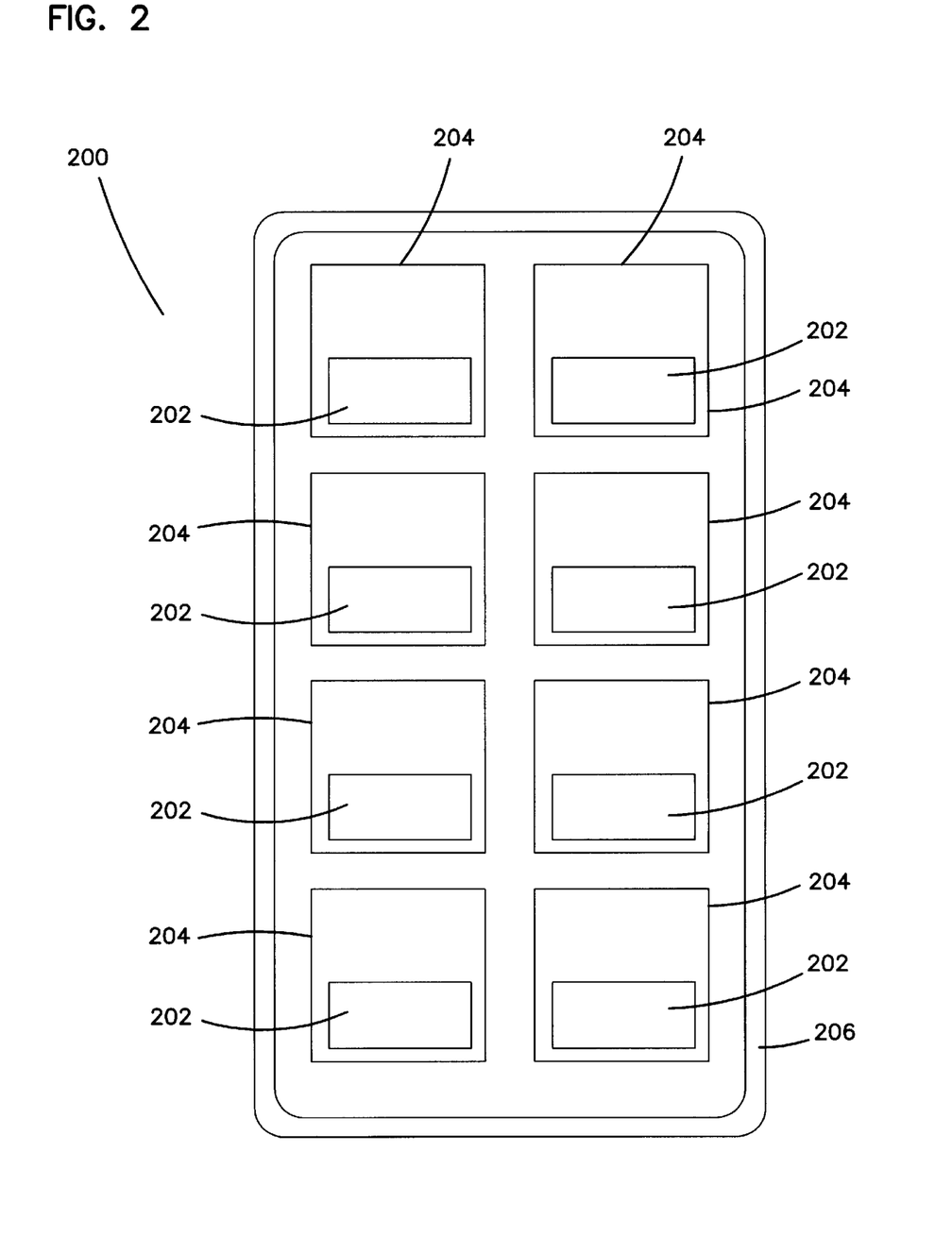
FIG. 2 illustrates a block diagram of an exemplary disk array system according to the present invention.

FIG. 2 illustrates a block diagram of an exemplary disk array system 200 according to the present invention. Several drives 202 are mounted to a carrier 204. The carrier 204 may be a drawer or a sled, for example. The carrier may be constructed from metal, plastic, a combination thereof, or a wide variety of other materials. Each drive 202 is attached to a carrier 209 either rigidly, through a compliant shock mount, or via other fasteners such as springs, for example. Each carrier is then attached to a frame 206. The frame 206 is often made of sheet metal and the attachment again may be rigid or through compliant shock mounts. The frame usually sits on the floor, but in small systems may fit on a table, or may be integrated into a housing with the host computer.

Figure 3:
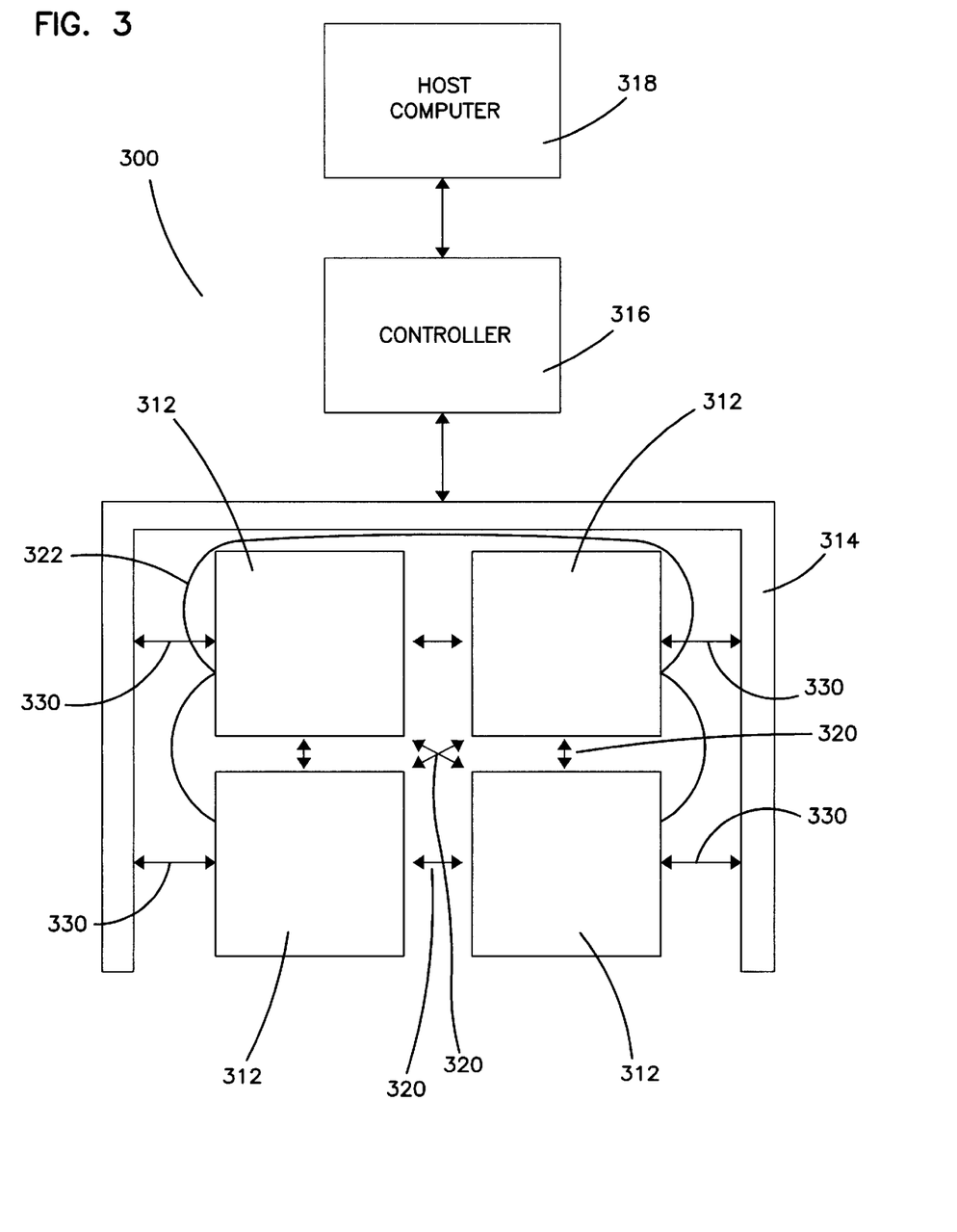
FIG. 3 illustrates the functional block diagram of rack mounted disk drives which may be synchronized according to the invention.

FIG. 3 illustrates the functional diagram 300 of rack mounted disk drives which may be synchronized according to the invention. Disk drives 312 are rack mounted and are controlled by a bus. For example, the synchronizing timing information as well as control and data may be passed over a SCSI or SSA bus, or another suitable bus such as a fiber channel loop 314. A controller 316 receives requests for data from, and passes data back to a host computer 318. Vibrations indicated by directional arrows 320 are induced by adjacent spindle motors and have an effect on all adjacent disk drives 312. The disk drives 312 are connected by a synchronizing timing bus 322 in order to pass synchronization timing information. In some architectures, for example SSA implementations, the bus 322 for synchronizing timing information is not needed.

One of the disk drives 312 is selected as a master, and a synchronization signal is routed by the synchronizing timing bus 322 to each of the disk drives from the selected master drive to synchronize the spindles in the disk drives. The disk drives 312 are connected to the synchronizing timing bus 322 and are shown in FIG. 3 to communicate with the fibre channel bus 314 via paths 330. Those skilled in the art will recognize that this communication path is illustrated in FIG. 3 merely for clarity since the fiber channel bus 314 is directly connected to each disk drive 312.

Figure 4:
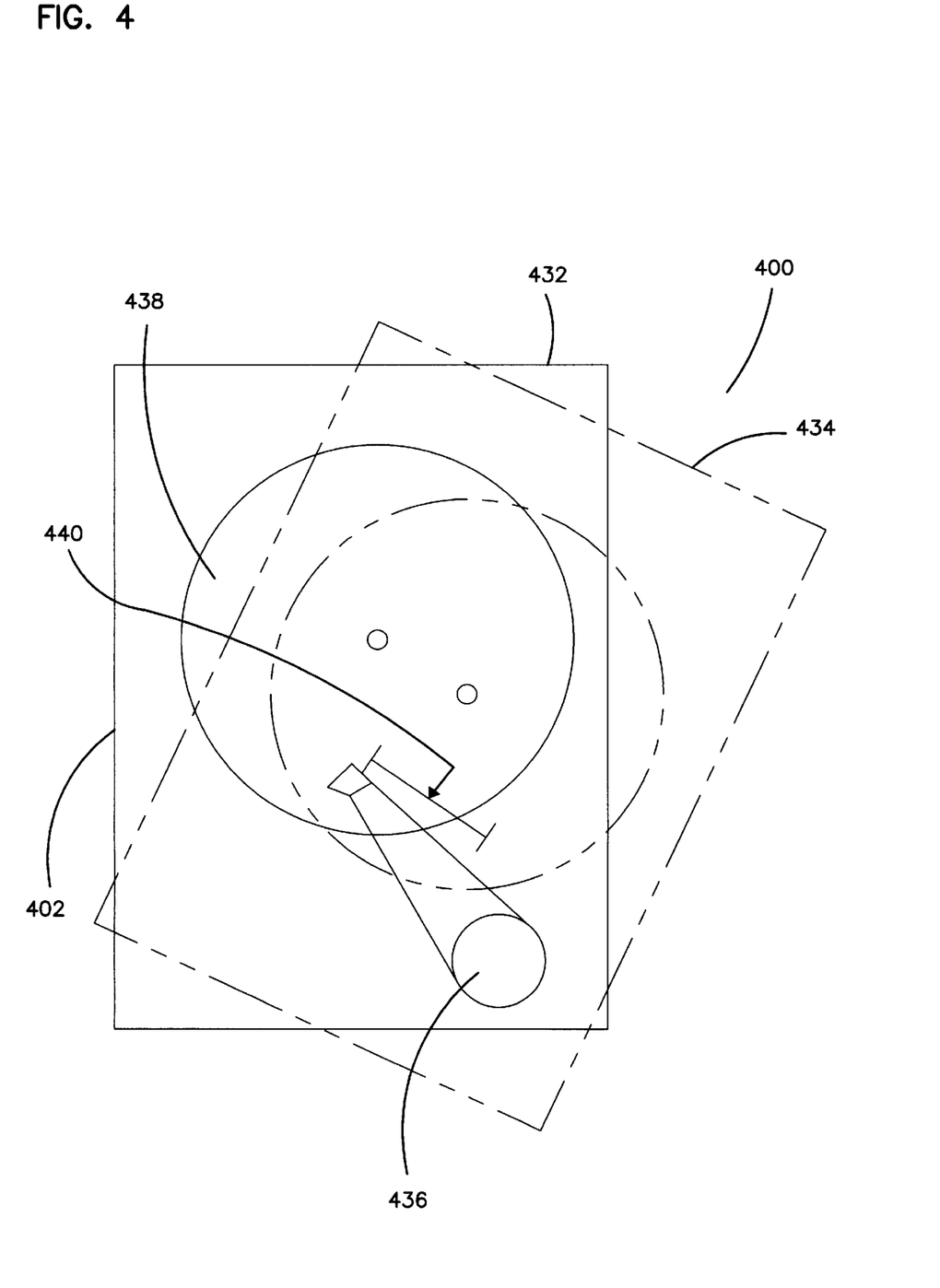
FIG. 4 illustrates the runout effect on a disk drive.

FIG. 4 illustrates the runout effect 400 on a disk drive. If the actuator 436 is balanced, then linear translations will not cause any track misregistration. However, rotational forces still cause problems. As illustrated, an external force moves the disk drive 402 from a first position 432 to a second position 434. The center of rotation is the pivot of the actuator 436, so the actuator 436 remains motionless. However, the disk 438 moves. This movement causes the apparent motion 440 which is the runout. Even when the actuator 436 is not balanced, or the center of rotation is not the pivot of the actuator 436, the actuator 436 will not generally move the same as the disk 438.

Spindle synchronization is a feature currently available on high end disk drives to improve performance in RAID applications. The present invention takes advantage of this feature by using it to reduce runout. The spindle is controlled so that each revolution starts at a fixed phase from a master pulse. The important consequence of this is that all the spindle motors are locked in time and runout is measured after synchronization. Thus, when drive-to-drive runout is measured, the runout phase will not change over time. Accordingly, the control designed to cancel runout will always be in phase.

According to the present invention, when a rack is first powered on, the drives are spun up to speed. One of the drives is designated as providing the master pulse. The controller commands each drive to synchronize to the master pulse, then the controller commands each drive to update its RRO cancellation control.

If a drive is added to the rack, the controller first commands it to sync to the master pulse, then commands each drive in the rack to update its RRO cancellation control. If a drive is removed from the rack, then the controller again commands each drive to update its RRO cancellation control.

Figure 5:
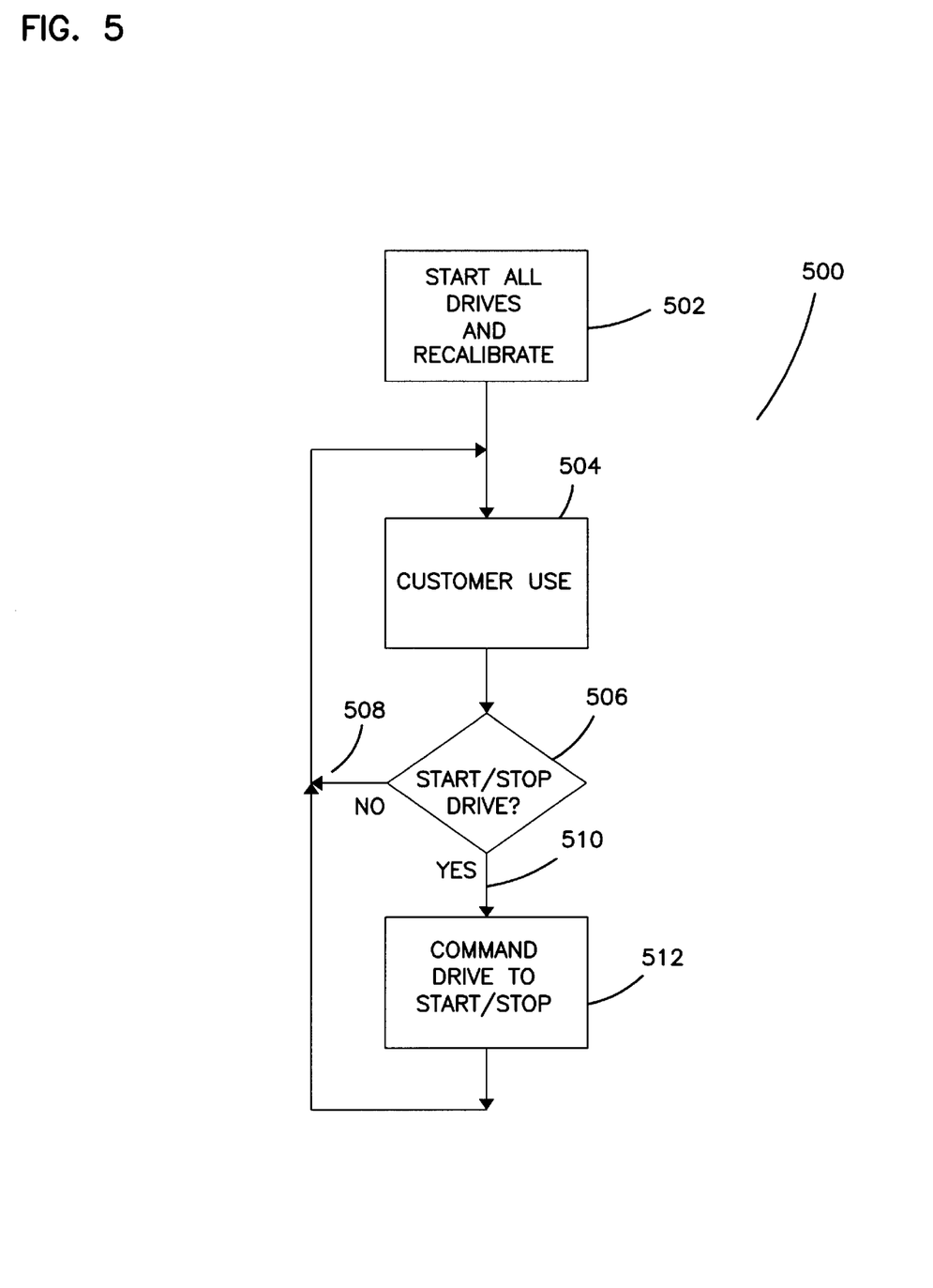
FIG. 5 is a flowchart of the control for a disk drive according to standard methods.

FIG. 5 is a flowchart of the control for a disk drive 500 according to conventional methods. First, all the drives are initiated and recalibrated 502. In step 504, user requests are processed. Whether a request is made by the customer for movement of the drive is determined in step 506. If movement is not necessary, then the drive waits upon further requests 508. If a change in the movement of the drive is necessary 510, a command is executed 512 and control is passed back to the user for receipt of further request.

Figure 6:
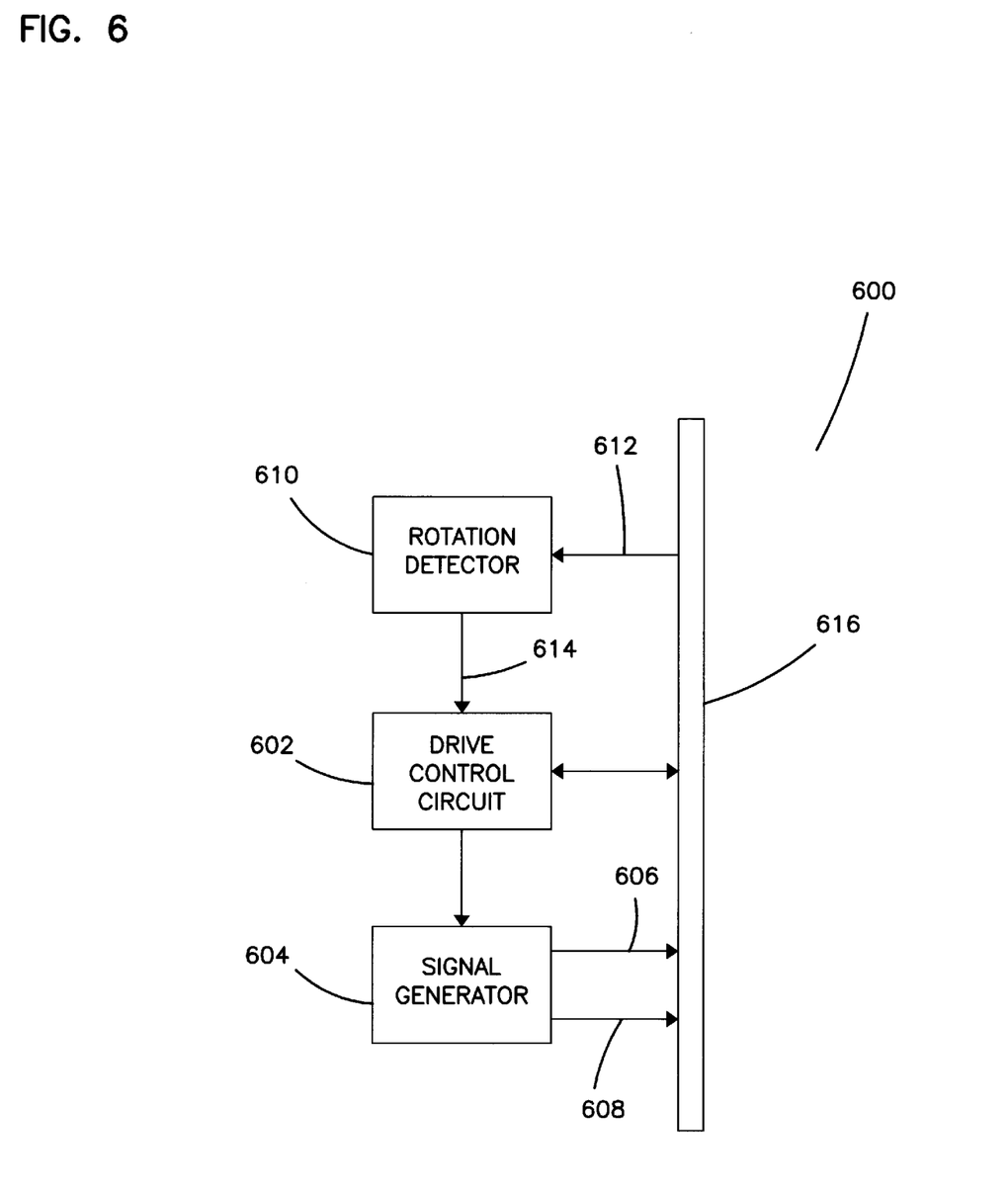
FIG. 6 illustrates a block diagram of an exemplary drive controller according to the present invention.

FIG. 6 illustrates a block diagram 600 of an exemplary drive controller according to the present invention. The controller of FIG. 6 may be coupled to a plurality of disk drives via a data bus 616 such as a SCSI bus, an SSA bus, or a fiber channel. The drive control circuit 602 initiates and recalibrates the drives. The drive control circuit 602 controls the synchronization of the disk drives, initiates runout cancellation calibration for the disk drives, and grants customer use of the disk drives. Runout cancellation calibration is the removal of periodic disturbances from the position error signal of the track positioning process. Typically, an algorithm is used to eliminate or greatly reduce the periodic disturbances to allow increased track positioning accuracy.

The signal generator 604 receives signals from the control circuit 602 for generating a master signal 606 and a runout cancellation calibration command 608. The master signal 606 commands the disk drives to synchronize rotation of the spindles and the runout cancellation calibration command 608 instructs the disk drives to recalibrate a runout cancellation.

The rotation detector 610 is also coupled to the control circuit 602. The rotation detector 610 detects a change in the rotation speed in any of the spindles 612 and provides to the control circuit 602 an indication 614 of whether the rotation of a spindle of a disk drive has changed. The drive control circuit 602 initiates resynchronization and recalibration of the runout cancellation for the disk drives in response to receiving an indication from the rotation detector 610 that rotation of at least one of the spindles in the plurality of disk drives has changed. The rotation detector 610 also detects the addition and deletion of a disk drive to the rack. The addition or removal of a disk drive to or from the rack is equated with a change in the rotation of the spindles thereby requiring resynchronization of the spindles and recalibration of the runout.

Figure 7:
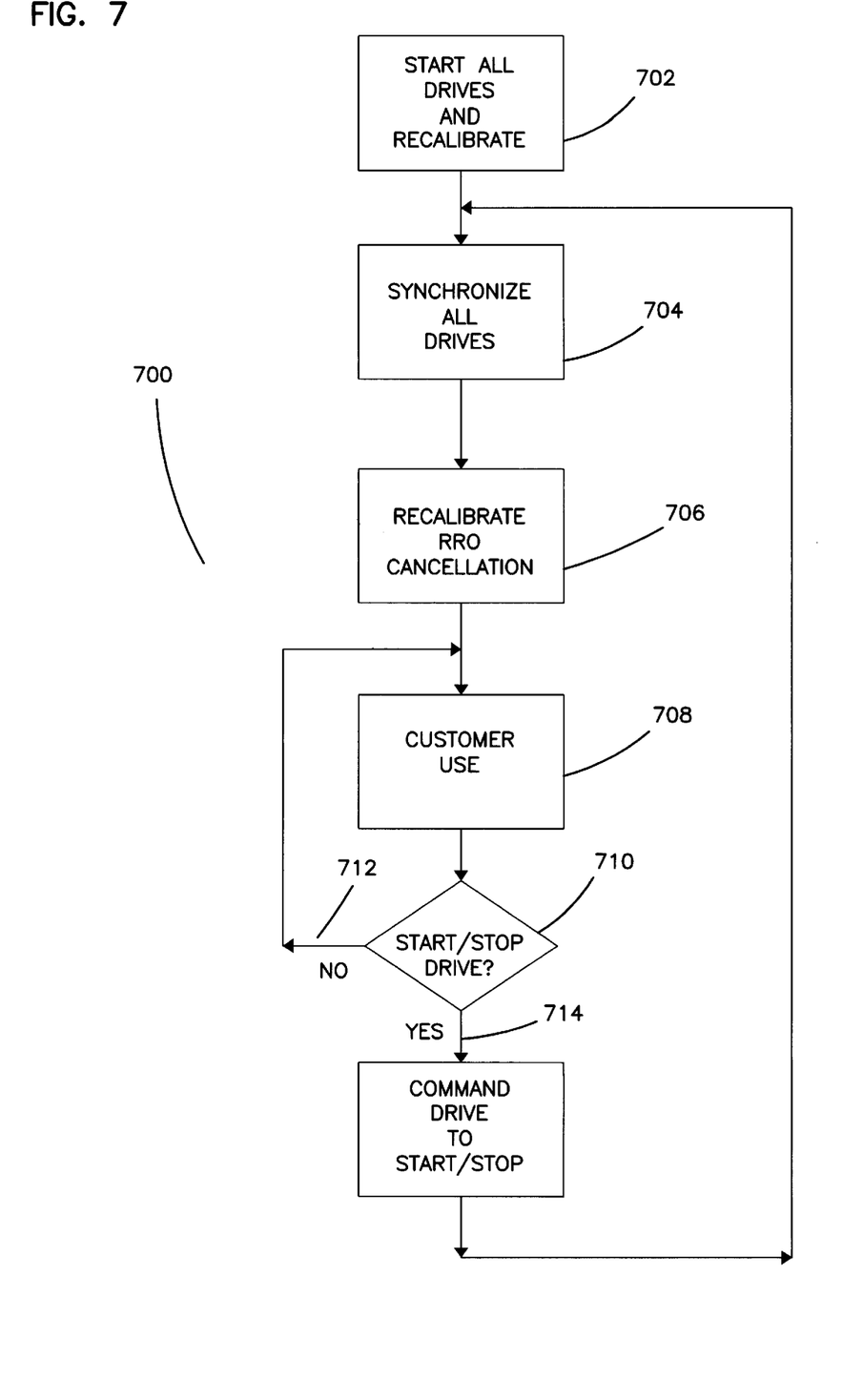
FIG. 7 illustrates a flowchart of the synchronization and runout calibration method according to the present invention.

FIG. 7 illustrates flowchart 700 according to the present invention. A plurality of disk drives are initiated and recalibrated 702. First, all of the drives are synchronized to a master synchronization pulse 704. Thereafter, the RRO cancellation is recalibrated 706. Then and only then is customer use allowed 708. A controller determines whether a drive that was stopped is restarted, a drive is stopped, or another drive is added or removed 710 i.e., a condition has occurred that may require recalibration of RRO. If none of these conditions are met, customer use is maintained 712. If motion for a drive spindle changes 714, the proper drive control is issued to the drive, and the controller returns to the step of synchronizing all drives 718.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive controller for cancelling runout, comprising:
   a drive control circuit for controlling synchronization of a plurality of disk drives and initiating synchronized runout cancellation calibration for the plurality of disk drives; and
   a signal generator, coupled to control circuit, for first generating a master signal and subsequently a runout cancellation calibration command for the plurality of disk drives, the master signal commanding the plurality of disk drives to synchronize rotation of the spindles and the runout cancellation calibration command instructing the plurality of disk drives to calibrate a runout cancellation in response to commands received from the control circuit.

2. The controller of claim 1 further comprising a rotation detector, coupled to the control circuit, for detecting a change in the rotation of the spindles and providing to the control circuit an indication of whether the rotation of a spindle of a disk drive has changed, wherein the drive control circuit initiates resynchronization and synchronized recalibration of the runout cancellation for the plurality of disk drives in response to receiving an indication from the rotation detector that rotation of at least one of the spindles in the plurality of disk drives has changed.

3. The controller of claim 2 wherein the rotation detector detects the addition of a disk drive to the rack, the addition of a disk drive to the rack being detected as a change in the rotation of the spindles.

4. The controller of claim 2 wherein the rotation detector detects the deletion of a disk drive to the rack, the deletion of a disk drive to the rack being detected as a change in the rotation of the spindles.

5. The controller of claim 2 wherein the rotation detector detects loss of synchronization of the disk drives.

6. The controller of claim 1 wherein one of the plurality of disk drives is selected as a master, and a synchronization signal is routed to each of the plurality of disk drives from the selected master drive for synchronizing the spindles in the plurality of disk drives.

7. The controller of claim 1 wherein the controller is coupled to the plurality of disk drives via a data bus.

8. The controller of claim 7 wherein the data bus is a SCSI bus.

9. The controller of claim 7 wherein the data bus is a SSA bus.

10. The controller of claim 7 wherein the data bus is a fibre channel bus.

11. The controller of claim 1 wherein the synchronization of the spindles phase-locks the rotation of the spindles of each of the plurality of disk drives, the runout cancellation for the plurality of disk drives being stabilized by the synchronization of the spindles.

12. The disk drive controller of claim 1 wherein the drive control circuit grants customers use of the plurality of disk drives.

13. A disk drive array, comprising:
   a plurality of disk drives for storing data arranged in an array rack;
   a data and control bus, coupled to the plurality of disk drives, for providing a path for data and control signals for the plurality of disk drives;
   a controller, coupled to the data and control bus, for managing the operation of the plurality of disk drives, the controller further comprising:
      a drive control circuit for controlling synchronization of a plurality of disk drives, initiating synchronized runout cancellation calibration for the plurality of disk drives; and
      a signal generator, coupled to control circuit, for first generating a master signal and subsequently a runout cancellation calibration command for the plurality of disk drives, the master signal commanding the plurality of disk drives to synchronize rotation of the spindles and the runout cancellation calibration command instructing the plurality of disk drives to calibrate a runout cancellation in response to commands received from the control circuit.

14. The disk drive array of claim 13 wherein the drive control circuit grants customer of the plurality of disk drives.

15. The disk drive array of claim 13 further comprises a rotation detector, coupled to the control circuit, for detecting a change in the rotation of the spindles and providing to the control circuit an indication of whether the rotation of a spindle of a disk drive has changed;
   wherein the drive control circuit initiates resynchronization and synchronized recalibration of the runout cancellation for the plurality of disk drives in response to receiving an indication from the rotation detector that rotation of at least one of the spindles in the plurality of disk drives has changed.

16. The controller of claim 15 wherein the rotation detector detects the addition of a disk drive to the rack, the addition of a disk drive to the rack being detected as a change in the rotation of the spindles.

17. The controller of claim 15 wherein the rotation detector detects the deletion of a disk drive to the rack, the deletion of a disk drive to the rack being detected as a change in the rotation of the spindles.

18. The controller of claim 15 wherein the rotation detector detects loss of synchronization of the disk drives.

19. The disk drive array of claim 13 wherein the synchronization signal generated by the signal generator is routed to each of the plurality of disk drives.

20. The disk drive array of claim 13 further comprising at least one host for requesting data from and sending data to the plurality of disk drives in the array rack.

21. The disk drive array of claim 13 wherein the data and control bus further comprises data and control paths from the controller to the plurality of disk drives.

22. The disk drive array of claim 21 wherein the data and control paths comprise a SCSI bus.

23. The disk drive array of claim 21 wherein the data and control paths comprise a SSA bus.

24. The disk drive array of claim 21 wherein the data and control paths comprise a fiber channel.

25. A method for controlling runout in an array of disk drives, comprising the steps of:
   synchronizing rotation of the spindles in a plurality of disk drives; and
   calibrating a synchronized runout cancellation for the plurality of disk drives.

26. The method of claim 25 further comprises the steps of monitoring the rotation of the spindles to determine whether the rotation of a spindle of a disk drive has changed; and
   repeating the synchronizing and calibrating steps in response to the rotation of at least one of the spindles in the plurality of disk drives changing.

27. The method of claim 26 further comprises the step of granting customer use of the plurality of disk drives.

28. The method of claim 26 further comprising the step of determining whether a disk drive is added; commanding the added disk drive to synchronize to the plurality of disk drives in response to determining a disk drive is added, and commanding the added drive and the plurality of disk drives to recalibrate a runout cancellation after the spindles have been synchronized.

29. The method of claim 26 further comprising the step of determining whether a disk drive is removed; commanding the remaining disk drives to synchronize to the synchronization signal in response to determining a disk drive is removed, and commanding the remaining disk drives to recalibrate a runout cancellation.

30. The method of claim 26 wherein the step of synchronizing the plurality of disk drives comprises the step of providing a master synchronization pulse to the plurality of disk drives.

31. The method of claim 26 further comprising the step of detecting loss of synchronization of the spindles.

* * * * *